United States Patent [19]
Cope et al.

[11] Patent Number: 5,121,291
[45] Date of Patent: Jun. 9, 1992

[54] VENTILATION SYSTEM IN A PORTABLE COMPUTER

[75] Inventors: Kenneth W. Cope; Leslie W. Kent, both of Chantilly; Christopher W. Gardner, Reston, all of Va.

[73] Assignee: Mentor Systems, Inc., Chantilly, Va.

[21] Appl. No.: 654,595

[22] Filed: Feb. 13, 1991

[51] Int. Cl.[5] .............................................. H05K 7/20
[52] U.S. Cl. .................................... 361/384; 361/383; 361/394; 361/399; 174/15.1; 165/58
[58] Field of Search ............... 361/383, 384, 394, 395, 361/396, 397, 399, 415; 165/58, 185; 174/15.1

[56] References Cited

U.S. PATENT DOCUMENTS

| | | | |
|---|---|---|---|
| 4,084,213 | 4/1978 | Kirchner et al. | 361/384 |
| 4,730,233 | 3/1988 | Osterman | 361/383 |
| 4,797,783 | 1/1989 | Kohmoto et al. | 361/384 |
| 4,817,865 | 4/1989 | Wray | 236/49.5 |
| 4,858,070 | 8/1989 | Baron et al. | 361/384 |

FOREIGN PATENT DOCUMENTS 0157507 10/1985 European Pat. Off. ............ 361/384

OTHER PUBLICATIONS

Gaunt et al., Cooling Electrical Equipment, IBM Technical Bulletin, vol. 20, No. 6, Nov. 1977.
Follette et al., Staggered Logic Memory Board Configuration for Improved Card Cooling, IBM Technical Bulletin, vol. 20, No. 7, Dec. 1977.
Catalog of National Semiconductor, pp. 9-163-9-176, published 1982.

Primary Examiner—Leo P. Picard
Assistant Examiner—Young S. Whang
Attorney, Agent, or Firm—A. Louis Monacell

[57] ABSTRACT

A portable computer having a cooling system with an intake fan and exhaust openings, one of which is provided with an exhaust fan which is located so that it diverts some of the air-flow to increase the flow of air over the power supply, the fans are activated whenever the temperature in any thermal area rises and the speed of the intake fan increases to meet the challenge of the highest temperature of any one of the thermal areas.

10 Claims, 2 Drawing Sheets

VENTILATION SYSTEM IN A PORTABLE COMPUTER

BACKGROUND OF THE INVENTION

Portable computers must be small, light, and sturdy yet have as large a data storage capacity as possible within the limits of these restrictions. The big obstacle to achieving this goal is the heat generated by the computer components. Various methods of cooling by ventilation have been attempted. A variable speed fan has been used, the speed of which varies with the temperature. It has also been proposed to provide air flow in a modular housing each containing modular electronic components by causing the fan to operate at a higher speed if the temperature in any of the modular compartments exceeds a threshold temperature.

SUMMARY OF THE INVENTION

It is a general object of this invention to provide an electronic device which is portable, compact, light in weight, sturdy and durable yet has the capability for the most advanced state of the art systems with improved data storage capacity. This objective is achieved by a unique cooling system which permits the placement of the computer components in close proximity to each other and still avoid over heating. It permits the ideal combination in a compact portable computer having the conventional computer components with the various storage peripherals for the most advanced state of the art systems.

It is a specific object of this invention to provide a system whereby the computer will not begin to function until heat produced by the components in the non-functioning state raises the temperature to a minimum desired level.

It is also an object of this invention to provide a unique ventilation system which protects the components from moisture condensation when the components are too cold and also protects the components from over-heating.

It is another object of this invention to increase the rate of air flow as the temperature of any individual component rises to maintain a safe temperature level.

It is still another object of this invention to increase the amount of air flow over the power supply by diverting more of the stream of cooling air passing through the computer over the power supply and to prevent recycling of the warmed air through the computer.

DESCRIPTION OF THE INVENTION

A specific embodiment of the invention comprises a chassis which together with a removable housing constitute an enclosure for computer components. The chassis comprises a base with vertical end walls and at least one vertical partition. There may be horizontal shelves attached to the end walls or partition to provide additional surface area to attach the computer components and to provide additional strength and rigidity.

There are at least three ventilation openings in the end walls of the chassis and a variable speed inlet fan in one opening and a single speed exhaust fan in another opening. There is an electronic circuit card which activates and regulates the air flow as more particularly described below.

The temperature in each of the thermal areas is sensed by sensing means and the computer will not function until the components are warmed by the heat generated in the non-functioning state to the proper level. The fans will not operate until the temperature within the computer rises above the condensation point. When the temperature rises in any thermal area to the point where cooling air is needed, the two fans commence operation. As the temperature in any thermal area rises, the speed of the variable speed fan progressively increases as the temperature increases over the entire range thus increasing the cooling capability of the cooling system.

DETAILED DESCRIPTION

The invention will be described and understood by reference to the accompanying drawings.

Figure 1:
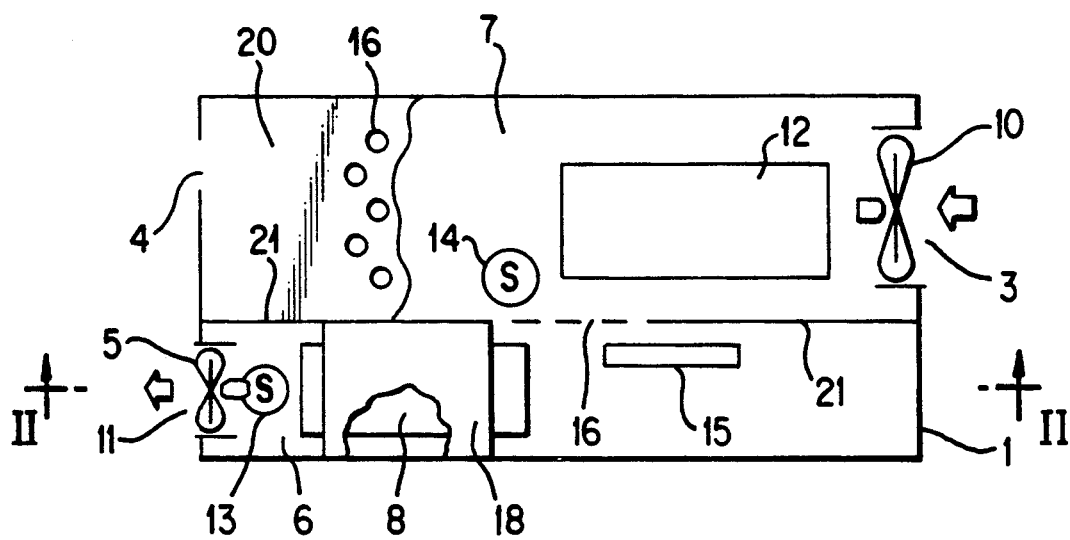
FIG. 1 is a cross-sectional horizontal view of the computer looking toward the base.
Figure 2:
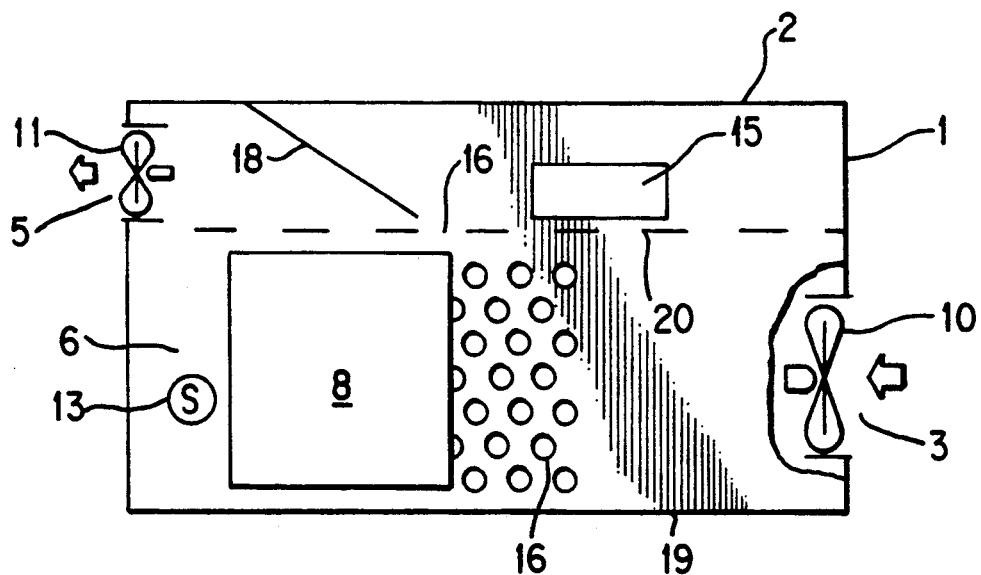
FIG. 2 is a vertical cross-section on line II—II of FIG. 1.

The chassis vertical end walls are designated as 1 in FIG. 1 and are attached to the base 19 as shown in FIG. 2. The removable housing 2 comprises two lateral sides and a top. When the housing is in place over the chassis, the enclosure is complete. Cooling air drawn in through opening 3 by variable speed fan 10, passes through all the thermal areas and exits through openings 4 and 5 and any other openings that may be provided such as the openings for the drives not shown.

Opening 5 is provided with a constant speed exhaust fan 11 so that the amount of cooling air passing through thermal area 6 is increased so as to more effectively cool this area which contains the power supply 8 which produces considerable heat. This thermal area may also be provided with an optional deflector 18 which increases the flow of air over these elements. This positioning of the exhaust fan 11 and the optional deflector 18 also each contribute to preventing the warmed air from recycling within the computer thus reducing the efficiency of the cooling system.

Any other thermal areas are also cooled as the cooling air passes through the computer. A significant thermal area is designated as 7 where the electronic computer components or microprocessor are located as shown at 12 in FIG. 1.

The size of the inlet opening 3 and the capacity of the intake fan 10 must be sufficiently large in relation to the exhaust openings and the exhaust fan capacity that an internal positive pressure is always maintained during fan operation. Thus sufficient air is drawn into the computer to cool every area of the computer and exit the openings 4 and 5 and all other openings.

The optional shelf (or shelves) is designated as 20 in FIG. 2. It is an important feature of this invention that the partition 21 and any shelves be perforated as designated at 16, to permit free movement of air throughout the interior of the computer. These perforations also serve to lessen the weight of the computer but preserve the strength of the partitions and shelves. For this purpose of lightening the weight more holes may be made than required for ventilation and some of these perforations may be covered with light plastic e.g. mylar. The plastic may be placed over holes strategically in such a way as to direct air flow over the thermal areas.

There are some convection effects and thus the system is designed to operate most efficiently in the normal upright position on its resilient feet, not shown.

The thermal areas 6 and 7 are provided with air temperature sensors, 13 and 14. Preferably, the sensors are located downstream from the heat sources. Thermistors are preferably employed which make air temperature measurements with integration via a small heat sink attached thereto and a Wheatstone Bridge.

The sensors are connected to a control circuit card 15 which monitors the two thermal areas 6 and 7.

DESCRIPTION OF THE CONTROL CIRCUIT BOARD

The control circuit card 15, described more fully below, computes the speed of the in-take fan 10 necessary to cool the components. As the temperature rises in any thermal area the speed of the fan 10 is increased until thermal equilibrium is achieved or maximum speed is reached. If the temperature rises above that which the cooling system can handle, the control circuit activates a warning signal as shown at 28 in FIG. 3.

Figure 3:
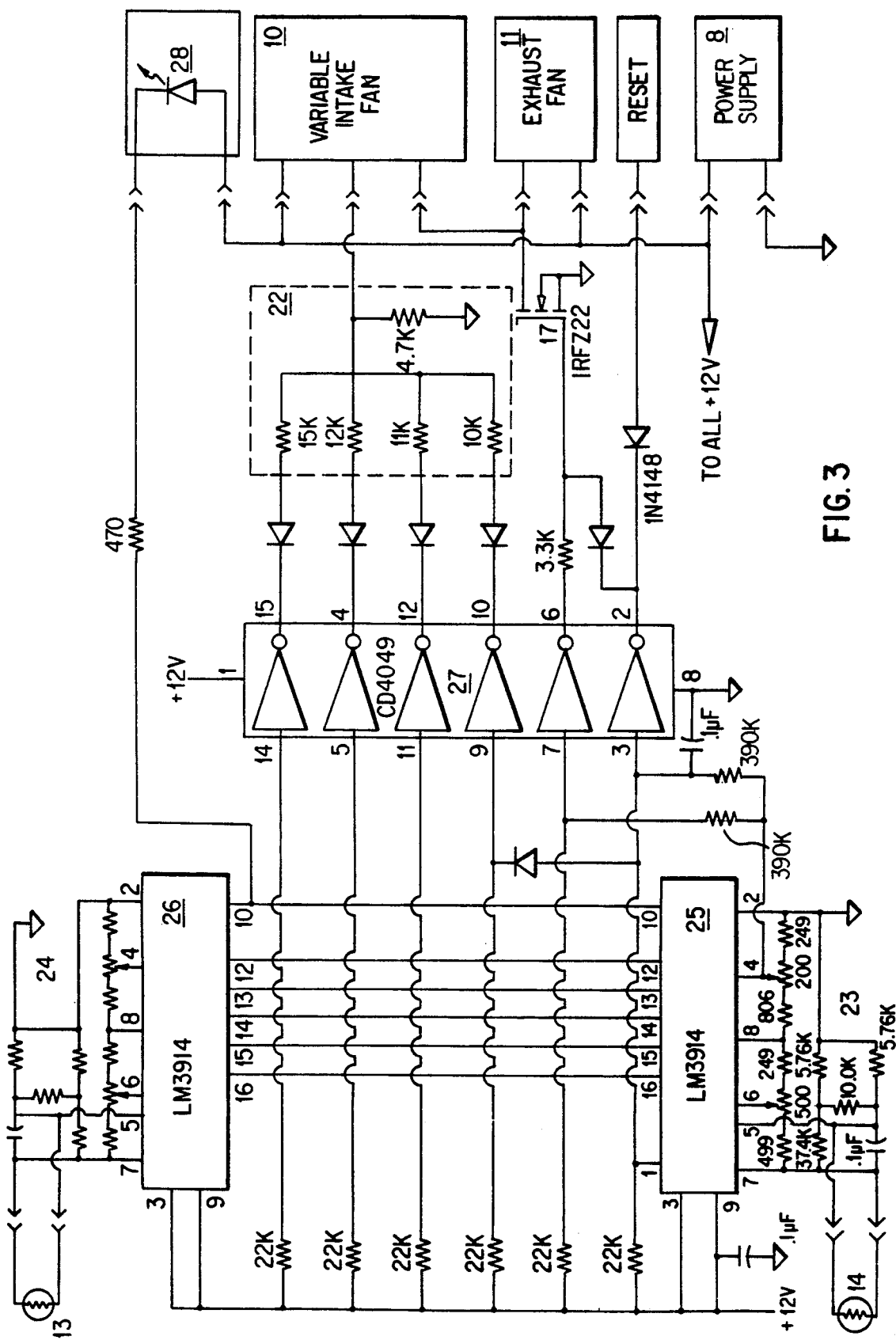
FIG. 3 is a schematic of the control circuit card.

FIG. 3 shows the circuitry of this card as it receives the analog voltage levels from sensors 13 and 14 and employs them to control the fans and achieve the other objects of the invention. The heat sensors 13 and 14 are thermistors which exhibit change in electrical resistance with change in temperature. This resistance is utilized within circuits 23 and 24, such as a Wheatstone Bridge, to obtain a voltage which is directly related to temperature.

Two Dot/Bar Display Drivers LM 3914, commercially available from National Semiconductor, are employed as integrated circuits 25 and 26 to receive the input characteristics from the thermistors and Wheatstone Bridges 23 and 24. The voltages from the Wheatstone Bridge 23 are connected to pin 5 of LM 3914 shown at 25 which converts the input voltage to digital logic outputs.

When the temperature is too low no outputs are asserted; thus the computer system is in a non functional state. As the temperature rises as a result of non-functional warming, pin 1 is asserted (low) and the reset is released and the computer commences operation. As the temperature continues to rise, pin 16 is asserted and the transistor IRFZ22 designated as 17 in FIG. 3 turns on causing both fans to operate. As the temperature continues to rise, pins 15, 14, 13, 12 progressively increase the speed of the intake fan.

The digital logic outputs from 25 which are linearly proportional to the temperatures are selectively wire-ORed into the circuit designated as 27 in FIG. 3. Circuit 27 is commercially available from National Semiconductor as CD4049. Within circuit 27 the specific input signals are buffered and inverted and presented as outputs to diodes (1N4148) as shown in FIG. 3. These diodes are readily available. These signals are presented to a resistive weighting network 22 to control the variable speed fan 10 such as Comair type MC12P3. FIG. 3 shows the various resistance values which may be used.

To enable one skilled in the art to better practice the invention, resistance values are shown in FIG. 3 where deemed necessary. The numbers shown in FIG. 3 adjacent integrated circuits 25, 26, and 27 are the designated pins on these circuits to which connection is made. Thermistor 13 is wired to the second LM3914, shown as 26 in the same manner as thermistor 14. Circuit 26 presents outputs similar to circuit 25. Outputs of 26 are hard-wired to the outputs of 25 to form a logical "OR" function, thus we have what is known as wireORed.

A known variant Wheatstone Bridge circuit is used at 23 and 24 with the thermistors to assist linearization of the thermistor's non-liner characteristic within the sensing temperature range in a manner known in the art. Capacitors may be used to reject potentially interfering conducted noise currents. A small amount of electrical feedback provides hysteresis to prevent "bounce" during transitions within digital output step changes.

Power supply 8 provides power for the computer components, the control circuitry, and the fans. The power supply supplies current as needed for the devices 11, 10, and 28. The current supplied to 11, 10, and 28 is controlled by the circuitry as described above.

What is claimed:

1. An apparatus comprising: a housing and a chassis having an air inlet opening provided with a fan and at least two outlet openings one of which is provided with an exhaust fan, wherein the air exits through all the outlet openings an electronic circuit and a power supply which generate heat thus creating thermal areas; a heat sensing means in each thermal area, control means which in response to anyone of the heat sensing means activates the fans, and wherein the exhaust fan is located so that it draws and diverts air flow within the housing over the power source to increase the amount of cooling air passing through the power source area to ensure sufficient cooling.

2. The apparatus of claim 1 wherein the control means activate the fans whenever any one thermal area requires cooling.

3. The apparatus of claim 1 wherein the heat-sensing means provides analog voltage levels which the control means employ to activate the fans.

4. The apparatus of claim 1 wherein a deflector is located so as to increase the flow of air through the thermal area of the power supply and also prevents the recycling of warmed air.

5. The apparatus of claim 1 wherein the chassis is provided with a partition and shelves which are perforated to permit free flow of air and to lighten the weight of the apparatus.

6. The apparatus of claim 5 wherein some of the perforations are covered with light plastic so as to direct air flow to the thermal areas.

7. Apparatus comprising: a housing and a chassis having an air inlet opening provided with a variable speed fan and at least two outlet openings, one of which is provided with a constant speed exhaust fan, wherein air exits through all the outlet openings, an electronic circuit and a power supply which generate heat thus creating thermal areas, heat sensing means in each of the thermal areas, control means which in response to the heat sensing means activates the constant speed fan and regulates the speed of the variable speed fan in accordance with the rate of air flow required to maintain the temperature of the components at optimum level, and the exhaust fan is located so that it draws and diverts air flow over the power source to increase the amount of air passing through the power source area to ensure sufficient cooling of this area.

8. The apparatus of claim 7 wherein the chassis is provided with a partition and shelves which are perforated to permit free flow of air and to lighten the weight of the apparatus.

9. The apparatus of claim 8 wherein some of the perforations are covered with light plastic so as to direct air flow to the thermal areas.

10. The apparatus of claim 7 wherein the speed of the variable speed fan increases progressively in response as the temperature increases over the range of temperatures.

* * * * *